United States Patent [19]

Jurewicz et al.

[11] Patent Number: 5,564,285
[45] Date of Patent: Oct. 15, 1996

[54] METHOD OF CONVERTING A TIME BASED DATA LOGGER TO A TIME AND RANDOM EVENT BASED DATA LOGGER

[75] Inventors: Romuald M. Jurewicz, St. Louis Park, Minn.; James E. Nixon, Troy, Mich.; Albert C. K. Wong, Golden Valley, Minn.; Jay L. Hanson, Bloomington, Minn.; Doyle G. Herrig, Elko, Minn.

[73] Assignee: Thermo King Corporation, Minneapolis, Minn.

[21] Appl. No.: 310,527

[22] Filed: Sep. 22, 1994

[51] Int. Cl.⁶ .................................................. F25B 49/02
[52] U.S. Cl. .............................. 62/127; 62/130; 340/585; 374/186
[58] Field of Search .............................. 62/125, 126, 127, 62/128, 129, 130, 157, 231; 340/584, 585, 588, 589, 870.16, 870.17; 364/557; 374/186

[56] References Cited

U.S. PATENT DOCUMENTS

| | | | |
|---|---|---|---|
| 4,882,564 | 11/1989 | Monroe et al. | 340/585 X |
| 4,949,550 | 8/1990 | Hanson | 62/127 X |
| 4,970,496 | 11/1990 | Kirkpatrick | 340/588 X |
| 5,123,251 | 6/1992 | Hanson | 62/89 |
| 5,123,252 | 6/1992 | Hanson | 62/89 |
| 5,123,253 | 6/1992 | Hanson et al. | 62/89 |
| 5,140,825 | 8/1992 | Hanson et al. | 62/89 |
| 5,140,826 | 8/1992 | Hanson et al. | 62/115 |
| 5,172,561 | 12/1992 | Hanson et al. | 62/127 |
| 5,181,389 | 1/1993 | Hanson et al. | 62/126 |
| 5,424,720 | 6/1995 | Kirkpatrick | 374/186 X |
| 5,437,163 | 8/1995 | Jurewicz et al. | 62/126 |
| 5,460,006 | 10/1995 | Torimitsu | 62/130 X |

*Primary Examiner*—Harry B. Tanner

[57] ABSTRACT

A method of adding asynchronous logging of data relative to events into a time based data logger which stores operator initiated headers in a data array, as well as synchronously storing data relative to variables of a transport refrigeration unit at predetermined constant time intervals. The operator associated headers include a preamble having a predetermined number of data bytes which include a header designator and a digital code which identifies the specific type of header being entered. An event header is provided having a preamble which includes the same number of data bytes as the preamble of the operator associated headers, for each type of event to be asynchronously stored in the data array. The header designator associated with the operator associated headers is inserted into the preamble of each of the event headers. A digital code is provided which identifies each event header, and the digital code is inserted into the preamble of each of the event headers. A data field follows the preamble of each event header, with predetermined data being inserted into the data field when an event occurs. An event header is stored in the data array asynchronously, at the time the associated event occurs. Each event header is time stamped when stored in the data array, and data stored in the data array is downloaded to a predetermined device, including asynchronously stored event headers and synchronous data stored at predetermined time intervals.

11 Claims, 12 Drawing Sheets

| ENTRIES TO DATA ARRAY | |
|---|---|
| DEFINITION OF ENTRY | TYPE OF ENTRY |
| 94 — START-OF-TRIP | HEADER |
| 96 — SENSOR REFERENCE | HEADER |
| 98 — REAL TIME CLOCK | HEADER |
| 100 — TEXT | HEADER |
| 102 — FRAME | HEADER |
| 104 — TWO SENSOR BASIC LOG | DATA |
| 106 — ADDITIONAL SENSORS | DATA |
| 108 — SET POINT CHANGE | DATA |
| 110 — ALARMS | DATA |

FIG. 2
PRIOR ART

| HEADER ENTRIES TO DATA ARRAY | | |
|---|---|---|
| DEFINITION | HEADER TYPE I.D. | # OF BYTES |
| 94 — START-OF-TRIP | 0 0 0 0 | 4 |
| 96 — SENSOR REFERENCE | 0 0 0 1 | 16 |
| 98 — REAL TIME CLOCK | 0 0 1 0 | 4 |
| 100 — TEXT | 0 0 1 1 | 4-128 |
| 102 — FRAME | 0 1 0 0 | 4 |
| 120 — ALARM | 0 1 0 1 | 8 |
| 122 — HOUR METER | 0 1 1 0 | 28 |
| 124 — GUARDED ACCESS | 0 1 1 1 | 52 |
| 126 — PRE-TRIP | 1 0 0 0 | 8-12 |
| 128 — MODE CHANGE | 1 0 0 1 | 8 |

FIG. 4

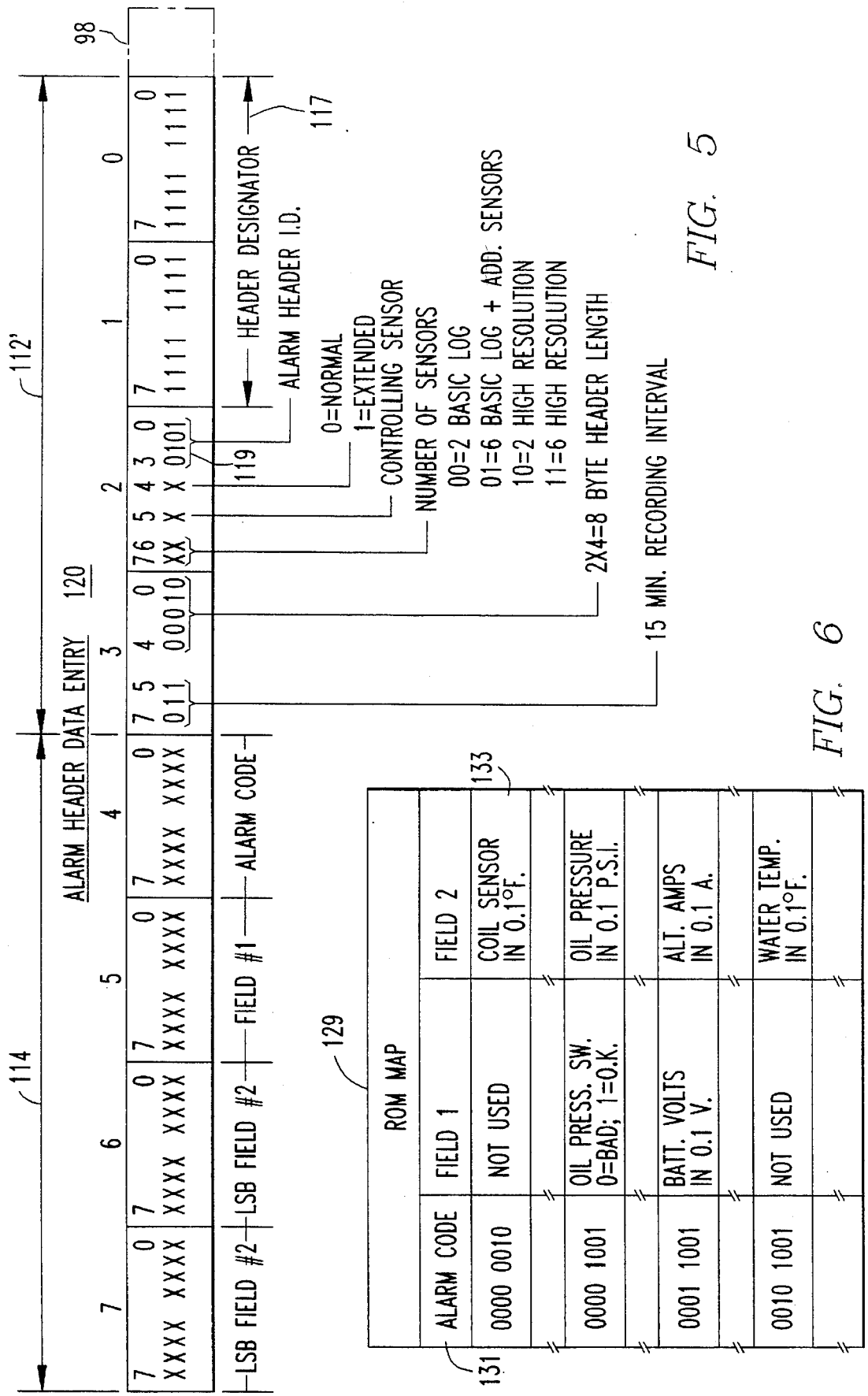

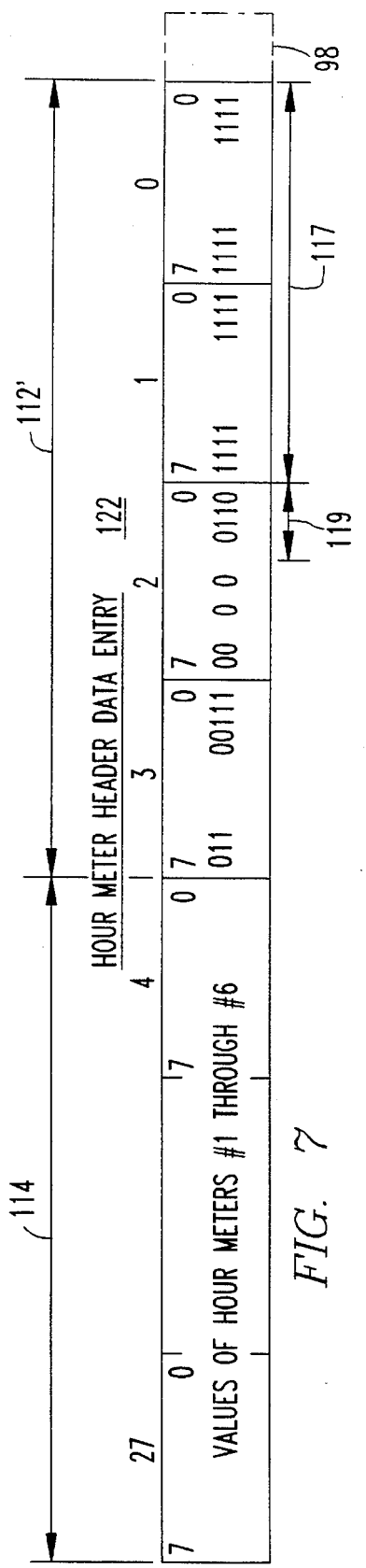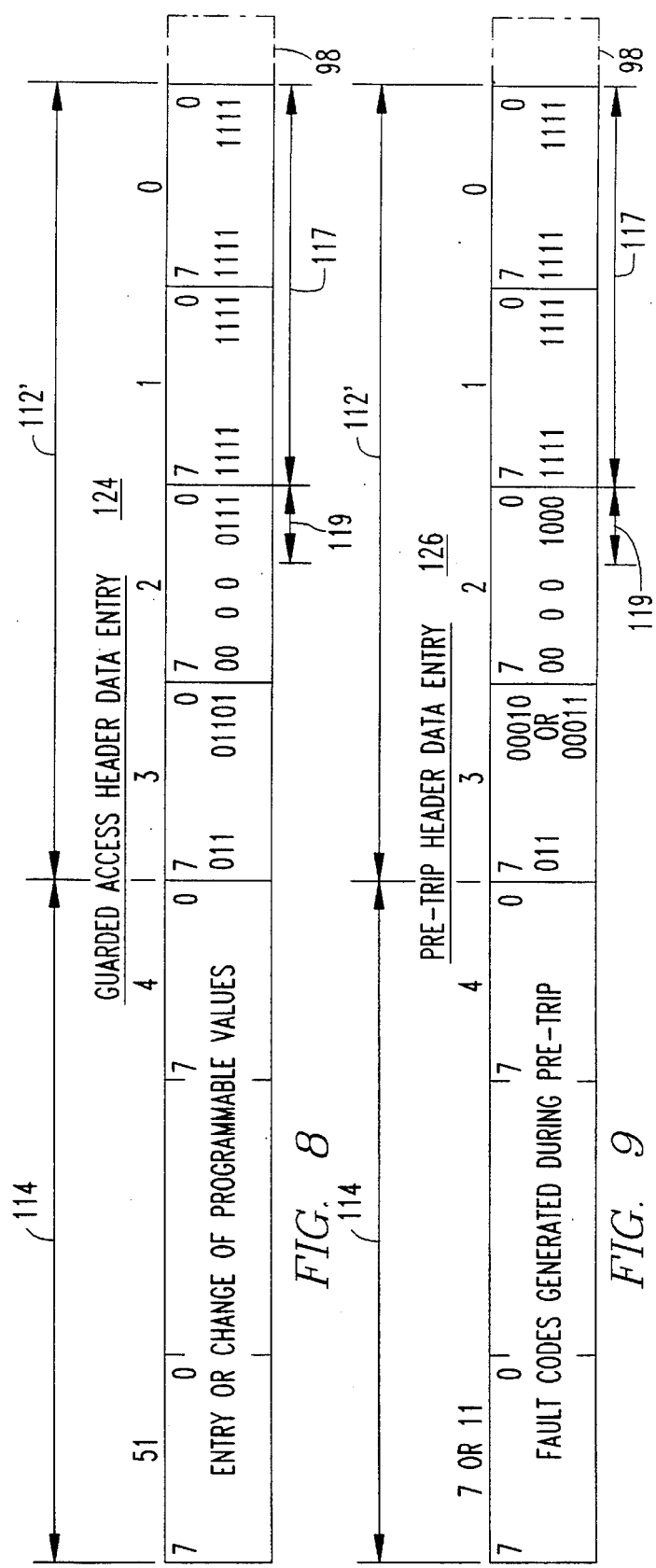
FIG. 7  FIG. 8  FIG. 9

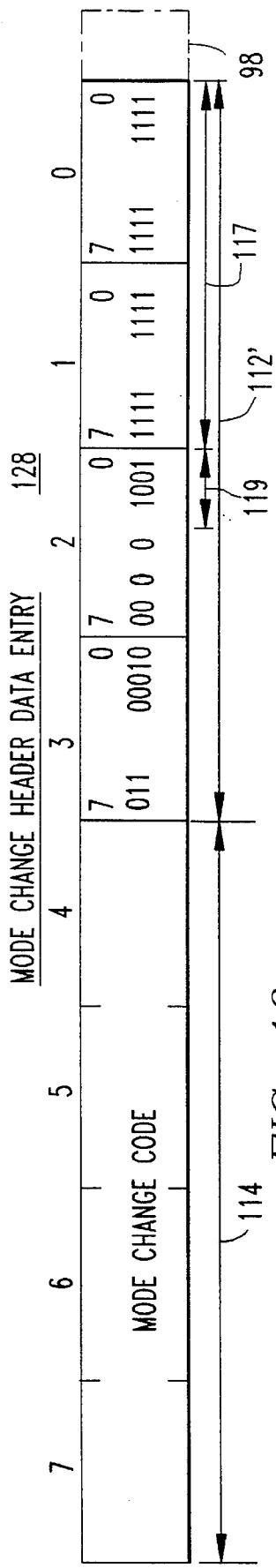

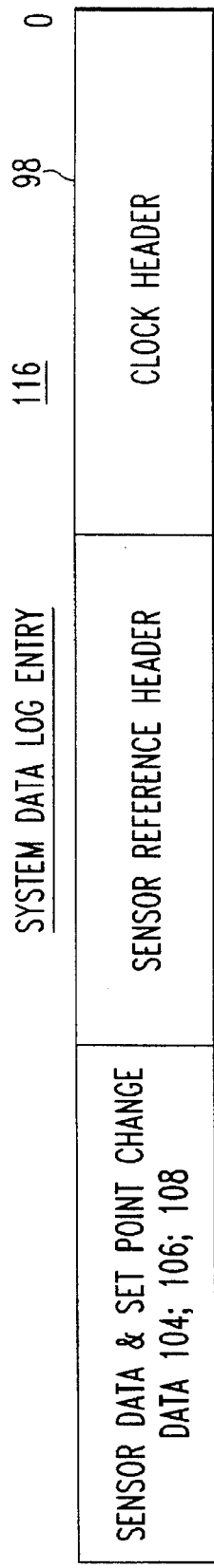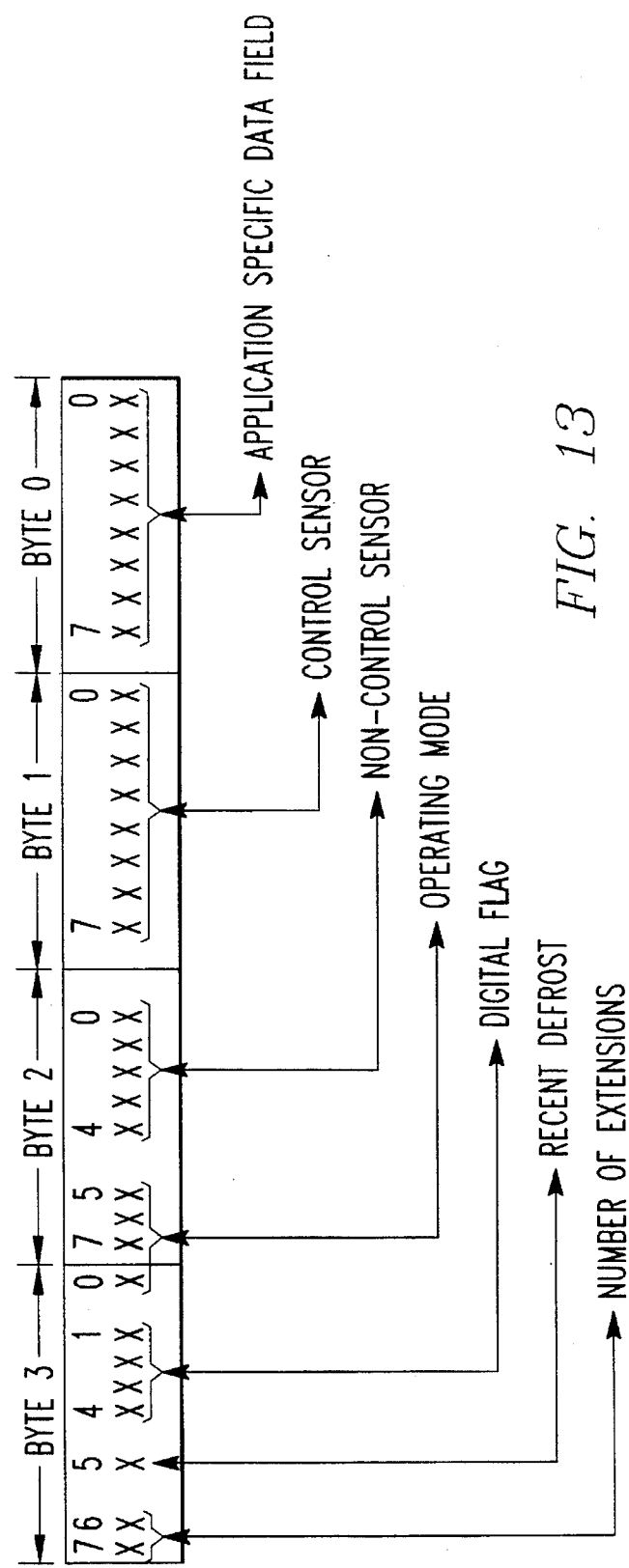
FIG. 12
FIG. 13

METHOD OF CONVERTING A TIME BASED DATA LOGGER TO A TIME AND RANDOM EVENT BASED DATA LOGGER

TECHNICAL FIELD

The invention relates in general to data loggers, and more specifically to data loggers for logging information relative to the operation of a transport refrigeration unit.

BACKGROUND ART

It is known to provide data loggers for transport refrigeration units, such as transport refrigeration units for straight trucks, tractor-trailer units, containers, and the like, which are time based. In other words, predetermined variables of the transport refrigeration unit are monitored by temperature sensors, humidity sensors, pressure sensors, and the like, and the readings of the sensors are recorded synchronously, ie., all readings are stored at once at predetermined constant time intervals. The stored readings are down loaded to a printer or computer at the end of each trip, to provide a record for each load carried by the associated transport refrigeration unit during each trip thereof. A Version 2.1 data logger available commercially from the assignee of the present invention is of this time based type.

U.S. Patent application Ser. No. 08/293 616, filed Aug. 22, 1994, U.S. Pat. No. 5,437,163, which is assigned to the same assignee as the present application discloses a data logger for transport refrigeration units which, in addition to recording variables at predetermined time intervals, also records data asynchronously relative to predetermined events which occur randomly or at non-scheduled times, such as alarms generated as a result of a detection of a malfunction in the operation of the transport refrigeration unit. The data logger of the patent application mentioned above takes advantage of a distributed control arrangement for transport refrigeration in which a global data base is shared by a plurality of communication nodes tied together with a serial bus.

It would be desirable, and it is an object of the present invention, to convert a time based data logger to a time and event based data logger, by utilizing the basic structure of the time based data logger and associated transport refrigeration unit apparatus, to make such a conversion economically and commercially feasible. In other words, such a conversion should not require the addition of a serial communications bus, serial communications controller, and a shared data base, as utilized in the hereinbefore mentioned co-pending patent application.

SUMMARY OF THE INVENTION

Briefly, the present invention is a method of adding asynchronous logging of data relative to predetermined events into a time based data logger. The time based data logger is of the type which stores operator initiated header entries in a data array, as well as data relative to predetermined variables of a transport refrigeration unit. Data relative to the predetermined variables of the transport refrigeration unit are stored synchronously, ie., at predetermined constant time intervals.

The operator initiated headers include a preamble having a predetermined number of data bytes which include a header designator and a digital code which uniquely identifies the specific type of header being entered.

The method includes the step of providing an event header having a preamble which includes the same number of data bytes as the preamble of the operator associated headers, for each type of event to be asynchronously stored in the data array. The method inserts the header designator associated with the operator associated headers into the same location of the preamble of each of the event headers as it occupies in the operator associated headers.

A digital code is provided which uniquely identifies each event header, and each digital code is inserted into the same location of the preamble of each of the event headers as the digital code occupies in the preamble of the operator initiated headers.

A data field follows the preamble of each event header, with the method further including the steps of inserting predetermined data into the data field of an event header when an event occurs, storing an event header in the data array asynchronously, at the time the associated event occurs, time stamping each event header when the event header is stored in the data array, and downloading data stored in the data array, such as at the end of a trip of the transport refrigeration unit, to a predetermined device, including asynchronously stored event headers and data stored synchronously at predetermined constant time intervals.

BRIEF DESCRIPTION OF THE DRAWINGS

The invention will become more apparent by reading the following detailed description in conjunction with the drawings, which are shown by way of example only, wherein:

FIG. 2 is a chart which illustrates how a prior art time based data logger initiates entry of operator initiated headers and time interval based data into a data array of the data logger, appending random or non-scheduled events synchronously to the periodic time based synchronous data logs;

FIG. 4 is a chart which illustrates how events are seamlessly added to the prior art time based data logger associated with FIG. 2, as they occur, utilizing the existing structure of the operator initiated headers shown in FIG. 3 to provide time stamped entries of events asynchronously into the data array of the data logger as the events occur;

FIG. 5 illustrates a modification of the header format of FIG. 3 according to the teachings of the invention, which modification implements the asynchronous entering of time stamped alarm information into the data array of the data logger;

FIG. 6 is a ROM map which illustrates how exemplary alarm codes and associated data fields, which are associated with predetermined bytes of the alarm header data entry shown in FIG. 5, are interpreted during print out and/or downloading of data log trip information from the data logger;

FIG. 7 illustrates a modification of the header format of FIG. 3 according to the teachings of the invention, which modification implements the asynchronous entering of time stamped readings of predetermined hour meters into the data array of the data logger, with the hour meters being used to record operational time of predetermined parameters of the transport refrigeration unit;

FIG. 8 illustrates a modification of the header format of FIG. 3 according to the teachings of the invention, which modification implements the asynchronous entering of time stamped readings of programmable constants associated with the transport refrigeration unit into the data array of the data logger, which constants are entered and changed through an interactive guarded access procedure by authorized personnel;

FIG. 9 illustrates a modification of the header format of FIG. 3 according to the teachings of the invention, which modification implements the asynchronous entering of fault codes into the data array of the data logger, which faults were generated during a pre-trip procedure used to check out the operation of a transport refrigeration unit before an actual trip;

FIG. 10 illustrates a modification of the header format of FIG. 3 according to the teachings of the invention, which modification implements the asynchronous entering of time stamped operational mode changes of the transport refrigeration unit into the data logger as each new operational mode is initiated;

FIG. 11 is a ROM map which illustrates how exemplary operating mode codes which are associated with predetermined bytes of the mode change header data entry shown in FIG. 10, are interpreted during print out and/or downloading of data log trip information from the data logger;

FIG. 12 illustrates the format of a system data log entry which follows operator initiated start-of-trip, text and frame headers, as shown in FIG. 3;

FIG. 13 illustrates the format of a 2 sensor basic log, normal resolution, data entry to the data array of the data logger, which entry is entered on a constant time interval basis;

DESCRIPTION OF PREFERRED EMBODIMENTS

Figure 1:
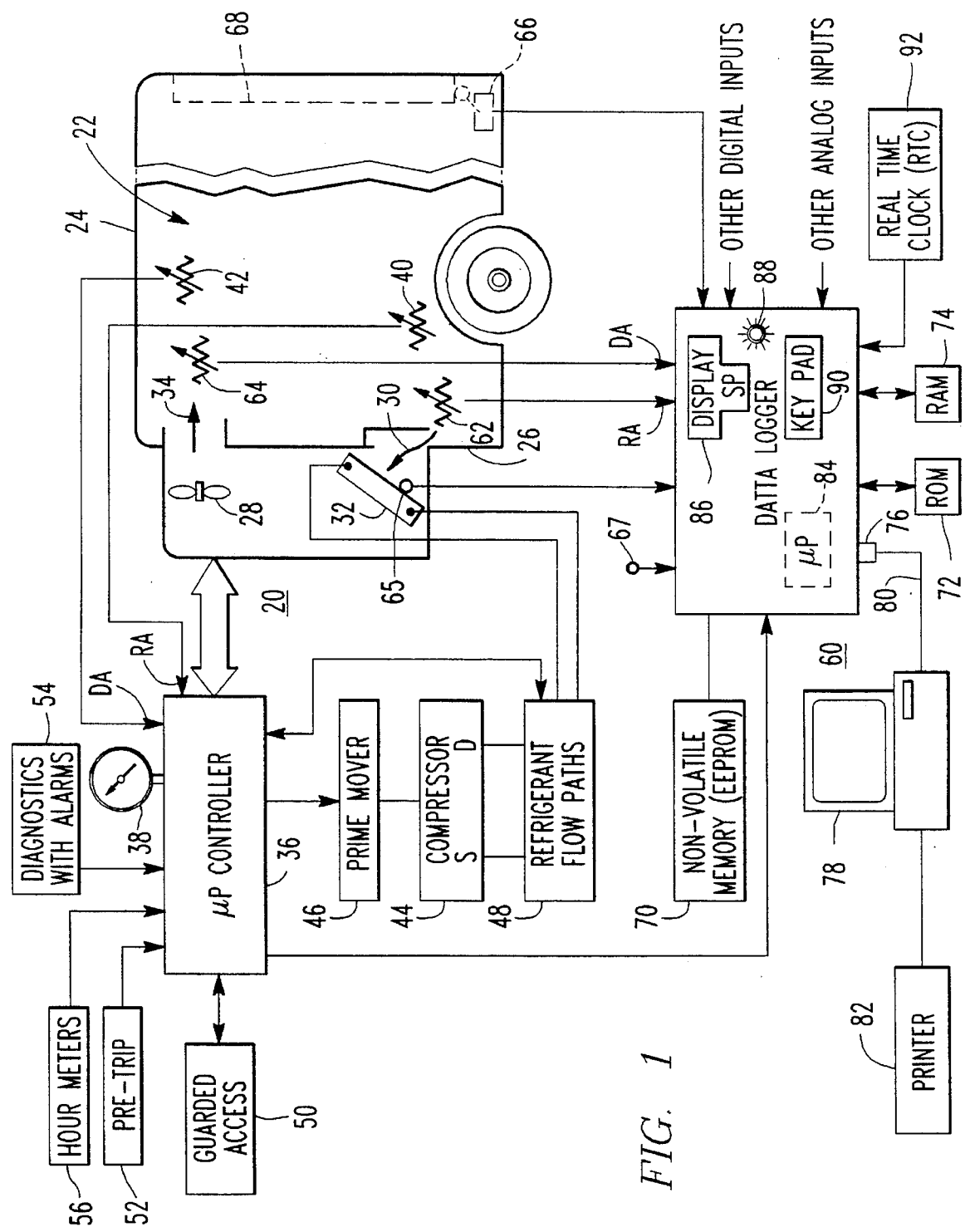
FIG. 1 is a diagrammatic view of a transport refrigeration unit and data logger of the type which may be converted from a time based data logger to a time and event based data logger, according to the teachings of the invention, recording data both synchronously and asynchronously.

Referring now to the drawings, and to FIG. 1 in particular, there is shown a transport refrigeration unit 20 which is illustrated as conditioning the air of a served space 22 defined by a vehicle 24. Vehicle 24 may be a trailer of a tractor-trailer combination, a straight truck, a container, or the like. Transport refrigeration unit 20, which may be mounted on a wall 26 of vehicle 24, for example, includes an evaporator fan or blower 28. Fan or blower 28 draws air, called "return air" and indicated by arrow 30, from conditioned space 22, and through an evaporator coil or heat exchanger 32. The resulting conditioned air, called "discharge air" and indicated by arrow 34, is discharged back into conditioned space 22.

Refrigeration valves and other control devices associated with transport refrigeration unit 20 are controlled by a microprocessor based thermostat or controller 36. Controller 36 has set point temperature selector means 38 for selecting the desired set point temperature of conditioned space 22. Controller 36 has inputs for receiving a signal RA from a return air temperature sensor 40 and a signal DA from a discharge air temperature sensor 42. In response to either the DA or RA signals, or both, controller 36 runs a control algorithm which at the start of a trip of transport refrigeration unit 20 pulls down the temperature of conditioned space 22 to the selected set point temperature and then holds the temperature of conditioned space 22 in a predetermined range adjacent to the selected set point temperature. U.S. Pat. No. 5,123,252, which is assigned to the same assignee as the present application, describes selection of a control algorithm to suit the configuration of transport refrigeration unit 20, and it also describes a plurality of different operational modes of transport refrigeration unit 20 which are used to control the temperature of conditioned space 22, and thus controller 36 will not be described in detail. U.S. Pat. No. 5,123,252 is hereby incorporated into the present application by reference.

Transport refrigeration unit 20 includes a refrigerant compressor 44 driven by a suitable prime mover 46, such as a diesel engine and/or an electric motor. Compressor 44 has discharge and suction ports D and S, respectively, which are connected to refrigerant flow paths of unit 20, shown generally at 48, with the hereinbefore mentioned evaporator coil 32 being connected in the refrigerant flow paths, as is well known in the art.

Transport refrigeration unit 20 has a plurality of programmable constants having default values which are changeable by authorized personnel via an interactive guarded access procedure, shown generally at 50. The procedure is referred to as "guarded access" as it requires the knowledge of an access code in order to gain access to the procedure. U.S. Pat. No. 5,123,251, which is assigned to the same assignee as the present application, discloses a suitable guarded access procedure in detail, and this U.S. Pat. No. 5,123,251 is hereby incorporated into the present application by reference.

Transport refrigerant unit 20 includes a pre-trip procedure, shown generally at 52, which checks unit 20 prior to a trip thereof, generating fault codes which identify any operating faults detected. U.S. Pat. No. 5,172,561, which is assigned to the same assignee as the present application, sets forth a pre-trip procedure in detail which may be used, and U.S. Patent No. 5,172,561 is hereby incorporated into the present application by reference.

Transport refrigeration unit 20 includes one or more diagnostic programs, shown generally at 54, which continuously monitor the operation of unit 20, generating an alarm when a malfunction is detected, along with an alarm code which identifies the type of malfunction. The hereinbefore mentioned U.S. Pat. No. 5,123,252 illustrates a sensor checking program with alarm generation which may be used. Other U.S. Patents assigned to the same assignee as the present application which describe alarm generation in detail include: U.S. Pat. No. 5,123,253, which discloses a warning and diagnostic system which classifies faults into different levels; U.S. Pat. No. 5,140,825 which discloses a DC current checking arrangement with alarm generation; and U.S. Pat. No. 5,140,826 which discloses different control algorithm programs having alarm generation. U.S. Pat. Nos. 5,123,253; 5,140,825 and 5,140,826 are hereby incorporated into the present application by reference.

Transport refrigeration unit 20 includes a plurality of hour meters, shown generally at 56, which are programmed via the guarded access procedure 50 to log operational time of selected components of unit 20, with the provision for generating maintenance alarms when programmable operating time values are reached. The hereinbefore mentioned U.S. Pat. No. 5,123,251 describes such hour meters in detail.

Data logger apparatus 60 which may be operated according to the methods of the invention is shown in FIG. 1. Data logger 60 is arranged to monitor the operation of transport refrigeration unit 20, and to record predetermined information relative to such operation. Data logger 60 is connected to a return air sensor 62 and to a discharge air sensor 64, with sensors 62 and 64 providing temperature signals RA and DA, similar to those provided to controller 36. Depending upon the type of transport refrigeration unit 20, one or more additional analog inputs may be connected to data logger 60, such as: an evaporator coil temperature sensor 65; an ambient air temperature sensor 67; additional temperature sensors, such as when unit 20 has more than one conditioned space; a humidity sensor which senses the humidity of the air in conditioned space 22; a sensor which senses atmosphere concentration, when a special atmosphere is maintained in conditioned space 22; and the like.

Digital inputs may also be provided to data logger 60, such as: an input from a door switch 66 which detects the position of a door 68 which controls access to conditioned space 22; inputs from switches connected to sense the position of any additional door or doors to conditioned space 22; inputs which sense the presence and absence of a control voltage on certain control conductors in controller 36, such as to detect defrost operation, cooling and heating modes, the operating speed of prime mover 46, and the like; and, inputs from controller 36 which indicate entry to, and exit from the guarded access procedure 50, completion of pre-trip procedure 52 along with any fault codes generated, the generation of an alarm by diagnostics and alarm generating programs 54, and the readings of hour meters 56.

Data logger 60 includes non-volatile memory 70, preferably a flash PROM, for storing data relative to the operation of transport refrigeration unit 20, a read-only memory (ROM) 72 for storing operational code, a random access memory (RAM) for storing variables generated during the running of application programs, and a port 76 for downloading information stored in memory 70 to a predetermined device, such as a personal computer 78 via a serial connector 80. A printer 82 for providing printed reports relative to trips made by transport refrigeration unit 20 may be connected to computer 138, or printer 82 may be connected directly to serial port 76, as desired.

Data logger 60 includes a microprocessor 84, a display 86 which includes a visual indicator 88 which may be flashed to indicate the presence of an alarm condition, and a key pad 90 for interactive communication between data logger 60 and a user of data logger 60. Data logger 60 also includes a real time clock 92.

Data logger 60 is of the type which records data relative to the operation of transport refrigeration unit synchronously, ie., at predetermined constant timed intervals. In this prior art type of data logging operator initiated headers and time interval data are stored in a data array. The data array either includes all of, or a pre-defined portion of, memory 70 shown in FIG. 1. Thus, memory 70 will also be hereinafter referred to as data array 70.

FIG. 2 is a chart tabulating the different prior art entries to data array 70. The operator initiated headers include a start-of-trip header 94, which is entered into data array 70 at the start of a new trip, a sensor reference header 96 which provides reference values for predetermined sensors, such as sensors 62 and 64, a real time clock header 98, a text header 100 which is used by a programmer to enter desired text into printed records of the trips of transport refrigeration unit 20, and a frame header 102 which is inserted into data array 70 each time about 10% of the memory space in data array 70 is used up. Frame headers 102 permit data space in data array 70 to be released in blocks, in the event wrap around of the allotted data space occurs.

The chart of FIG. 2 also lists the prior art entries to data array 70 which are classified as synchronous data entries because the entries to data array 70 are made at predetermined constant time intervals. These data entries include a two sensor basic log 104, the logging of data from any additional sensors, indicated at 106, the logging of data relative to a change in the selection of the set point temperature, indicated at 108, and the entry of data identifying any alarms which may have been generated by controller 36 since the last recording interval, with alarm data being indicated at 110.

Figure 3:
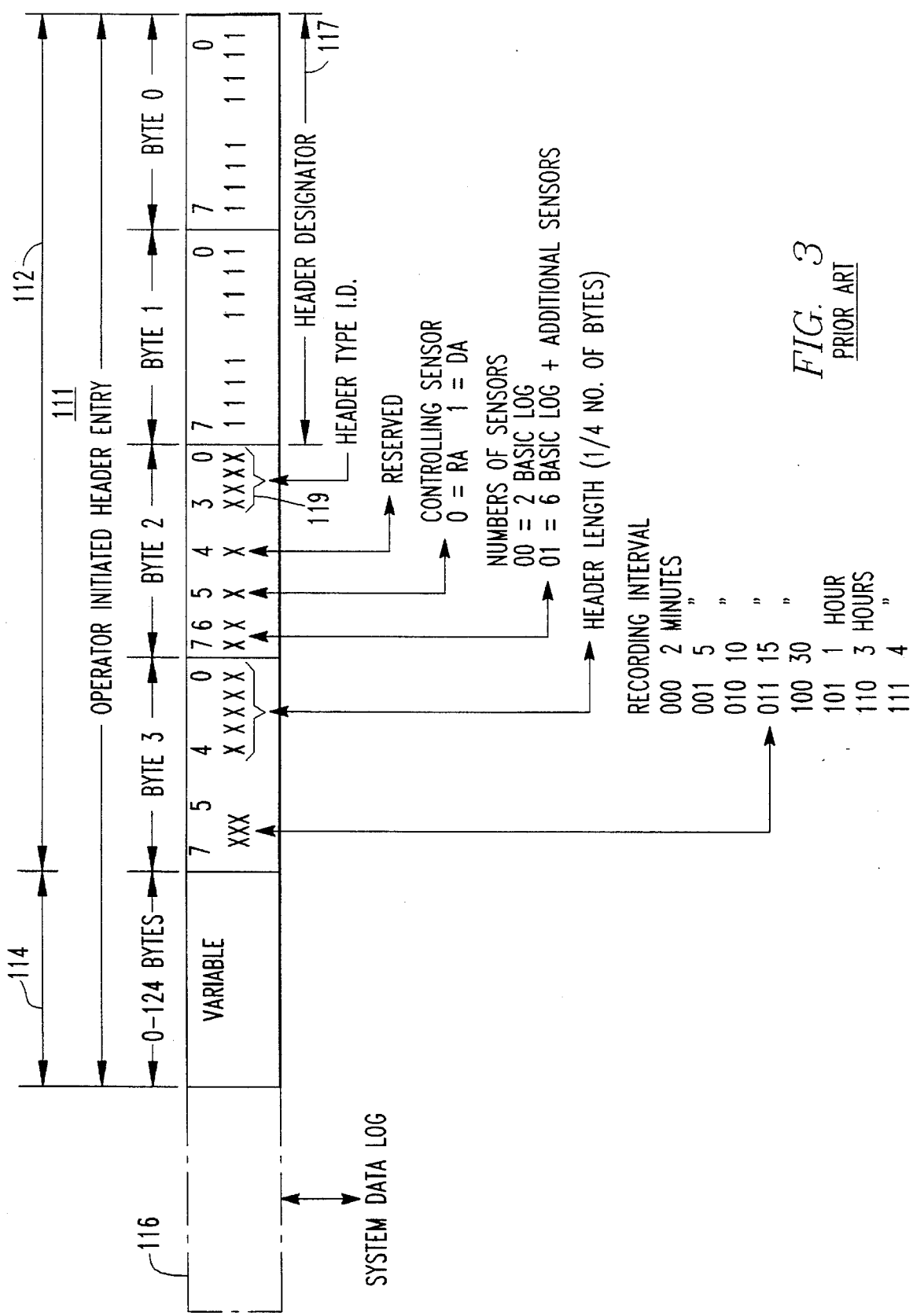
FIG. 3 illustrates a byte-for-byte generic format utilized by the operator initiated headers shown in the chart of FIG. 2, including a header designator and control bytes.

FIG. 3 illustrates the header entry format of the prior art headers 94, 96, 98, 100 and 102, illustrated generally with reference 111. Each header entry 111 includes a four byte preamble 112 and a data field 114. The data field has 0 to 124 bytes, depending upon the header. The start-of-trip header 94, real time clock header 98 and frame headers have a 0 byte data field 114, the sensor reference header has a 12 byte data field 114, and the text header 100 has up to 124 bytes in the data field 114, depending upon the length of the text. The start-of-trip header 94, text header 100 and frame header 112 are each followed by a system data log 116, shown in broken outline in FIG. 3, and in detail in FIG. 12, which will be hereinafter described.

Bytes 0 and 1 of header preamble 112 form a header designator 117 having a predetermined fixed digital value which indicates that the entry into the data array 70 is a header entry. For purposes of example, the digital value of bytes 0 and 1 of a header entry are $FFFF_{16}$, with this initial value being illegal for any other entry to data array 70.

Bytes 2 and 3 of preamble 112 of the prior art header entry 111 form a control word. Bits 0–3 of byte 2 are a digital code 119 which identifies the type of header being entered. Bit 4 of byte 2 is reserved and not used in the prior art header entry format. Bit 5 of byte 2 indicates which temperature sensor is the controlling temperature sensor in the particular control algorithm being used, with logic 0 indicating that the return air temperature sensor 40 is the controlling sensor, and with logic 1 indicating that the discharge air temperature sensor 42 is the controlling sensor. Bits 6 and 7 of byte 2 indicate the number of sensors to be logged, with 00 indicating the two sensor basic log 104 of FIG. 2, and with 01 indicating between 3 and 6 sensors, ie., the two sensor basic log plus data from additional sensors, indicated at 106 in FIG. 2.

Bits 0–4 of byte 3 indicate the length of the header. The digital value of these bits indicates the number of 16-bit words, and thus the digital value is multiplied by 4 to obtain the number of 8-bit bytes. Bits 5–7 of byte 3 indicate the recording interval, ie., how often data is to be read and stored in data array 70. For example, values 000 through 111 may progressively indicate longer time intervals, such as from 2 minutes to 4 hours.

According to the teachings of the invention, a time based data logger is changed to a time based plus event based data logger by utilizing a modified form of the operator initiated header entry 111 shown in FIG. 3 plus the real time clock header entry 98 to enter time stamped event information into data array 70 at the time the event occurs. Thus, instead of the headers being operator initiated, the headers are event initiated. FIG. 4 is a chart which illustrates header entries to data array 70 formatted according to the teachings of the invention. The first five header entries are the same as the start-of-trip, sensor reference, real time clock, text and frame headers 94, 96, 98, 100 and 102, respectively, described relative to FIG. 2. The header entries below horizontal line 118 in FIG. 4 are new header entries formatted according to the teachings of the invention. The new entries include an alarm header entry 120, for recording alarms from diagnostic and alarm generation program 54 an hour meter header entry 122 for recording readings of hour meters 56; a guarded access header entry 124 which is entered into data array 70 when the guarded access procedure 50 is accessed, and also when the guarded access procedure 50 is terminated, to record the values of programmable constants before and after any modification thereof; a pre-trip header entry 126 which is entered at the conclusion of the pre-trip procedure 52 to record any fault codes generated during the pre-trip procedure 52; and a mode change header entry 128 to data array 70, which identifies each new operating mode of unit 20 while indicating the time that each new operating mode of transport refrigeration unit 20 is initiated. As the table of FIG. 4 indicates, each header has a different header type identification in the form of bits 0–3 of byte 2 of the header preamble 112. The table of FIG. 4 also indicates the total number of bytes in each header. For example, alarm header entry 120 has 8 bytes, the 4 byte preamble 112 and a 4 byte data field 114; the hour meter header entry 122 has 28 bytes; the guarded access header entry has 52 bytes; the pre-trip header entry 126 has either 8 or 12 bytes, depending upon how many faults are found during the pre-trip procedure 52; and, the mode change header entry has 8 bytes.

FIG. 5 illustrates the format of the alarm header data entry 120 according to the teachings of the invention. A real time clock header 98 is provided along with alarm header 120, in order to time stamp the entry of alarm header 120 into data array 70. The meaning of certain bits of the preamble of the event headers has been changed, and thus the preamble of the event headers is referenced 112' Bytes 0 and 1 of preamble 112' set forth the header designator and thus the digital values of bytes 0 and 1 are the same as bytes 0 and 1 of the prior art header designator shown in FIG. 3, ie., FFFF$_{16}$. Bits 0–3 of byte 2 set forth the unique digital code selected to indicate an alarm header, ie., 0101, as indicated in FIG. 4.

Bit 4 of byte 2, instead of being reserved, is used according to the teachings of the invention to distinguish between two different formats of the data being entered on a timed interval basis, relative to the length of a digital code field used to identify different operating modes of unit 20, as will be hereinafter explained. A logic 0 indicates a "normal" field size for operating mode code, and a logic 1 indicates an extended field size for operating mode code.

Bit 5 of byte 2 is used to indicate the controlling sensor, the same as in the prior art header format of FIG. 3.

Bits 6 and 7 of byte 2 use digital values 00 and 01 to indicate 2, and 3 to 6 sensors, respectively, the same as in FIG. 4. In the present invention, these two bits are also used to introduce a higher resolution in the readings of the return air and discharge air temperature sensors 40 and 42, respectively, with the digital value 10 indicating a two sensor basic log with higher resolution than indicated by the digital value 00, as will be hereinafter explained relative to FIGS. 13 and 14. In like manner, the digital value 11 indicates a higher resolution log with 3–6 sensors.

Byte 3 of preamble 112' in FIG. 5 is the same as byte 3 of preamble 112 in FIG. 3, indicating the length of the header and the selected constant recording interval for time based data recording.

Alarm header 120 has a 4 byte data field 114, with the first byte of the data field 114, which is byte 4 of the alarm header entry 120, containing an alarm code which identifies the specific type of alarm generated. The second byte of data field 114, which is byte 5 of alarm header 120, forms a first data field, called field #1, and the third and fourth bytes of data field 114, which are bytes 6 and 7 of alarm header 120, form a second data field, called field #2, with byte 6 being the least significant byte and byte 7 being the most significant byte.

FIG. 6 is a ROM map 129 which illustrates alarm codes 131 which may be generated, along with the contents 133 of the two data fields. An alarm code indicating a malfunction of temperature sensor 65 used to sense the surface temperature of evaporator coil 32 has the digital value of 0000 0010. Field #1 is not used, while field #2 sets forth the reading of coil temperature sensor 65 in 0.1°0 F. An alarm code having a digital value of 0000 1001 indicates that prime mover 46, when an internal combustion engine, has an oil pressure problem. Field #1 indicates the condition of an oil pressure switch, with logic 0 indicating it is bad, and logic 1 indicating that it is O.K. Field #2 sets forth the reading of an oil pressure sensor in 0.1 pounds per square inch (psig). An alarm code having a digital value of 0001 1001 indicates a power supply problem, with field #1 setting forth the voltage reading in 0.1 volts, of a battery used to start prime mover 46 when it includes an internal combustion engine, and field #2 sets forth the electrical current reading of an alternator associated with the power supply, in 0.1 amperes. An alarm code having a digital value of 0010 1001 indicates an over temperature problem in the prime mover 46, when the prime mover is an internal combustion engine, with field #1 not being used, and with field #2 containing the temperature of engine coolant in 0.1 °0 F.

FIG. 7 illustrates the format of hour meter header data entry 122. Preamble 112' is the same as the preamble 112' of alarm header 120, except utilizing the hour meter header I.D. of digital 0110, and with a different header length digital value of 00111, indicating 7 words or 28 bytes. The 24 byte data field contains the readings of up to and including 6 hour meters, with the hour meters being indicated at 56 in FIG. 1. Similar to alarm header 120 shown in FIG. 5, a real time clock header 98 precedes the hour meter header 122, to provide a time stamp which establishes the time of the reading.

FIG. 8 illustrates the format of guarded access header data entry 124. Preamble 112' is the same as the preamble 112' of alarm header 120, except utilizing the guarded access header I.D. of digital 0111, and with a different header length digital value of 01101, indicating 13 words or 52 bytes. The 48 byte data field contains all of the values, default, or as changed by guarded access procedure 50 of all of the programmable constants of the transport refrigeration unit 20. Such constants include, for example, values associated with certain of the hour meters, which values indicate that when the reading of the associated hour meter reaches a predetermined assigned value, that a maintenance alarm should be generated. Similar to alarm header 120 shown in FIG. 5, a real time clock header 98 precedes the guarded access header 124, to provide a time stamp which establishes the time of the entry or exit from the guarded access procedure 50. Guarded access header 124 is entered into data array 70 when the guarded access procedure 50 is initiated, to record the readings of the programmable constants prior to modification, and guarded access header 124 is also entered into data array 70 when the guarded access procedure 50 is terminated, to record the readings of the programmable constants after modification.

FIG. 9 illustrates the format of pre-trip header data entry 126. Preamble 112' is the same as the preamble 112' of alarm header 120, except utilizing the pre-trip header I.D. of digital 1000, and with a different header length of digital 00010, or 00011, indicating either 2 words (8 bytes), or 3 words (12 bytes). The 4 and 8 byte data fields contain any fault codes generated during the pre-trip procedure 52, with the length of the data field being selected according to the number of fault codes generated. Similar to alarm header 120 shown in FIG. 5, a real time clock header 98 precedes the pre-trip header 126, to provide a time stamp which establishes the time of the entry.

FIG. 10 illustrates the format of mode change header data entry 128. Preamble 112' is the same as the preamble 112' of alarm header 120, except utilizing the mode change header I.D. of digital 1001. The 4 byte data field contains a code which identifies the newly initiated operating mode of transport refrigeration unit 20. Similar to the alarm header 120 shown in FIG. 5, a real time clock header 98 precedes the hour meter header 122, to provide a time stamp which establishes the time of the operational mode change. FIG. 11 is a ROM map 135 setting forth exemplary operating mode codes 137, a description of the operating mode, and the text which is printed in a print-out to identify the operating mode. For example, an operating mode code of 0000 0001 indicates that the prime mover 46 is a diesel engine operating in an on-off cycling mode at the higher of two operating speeds, and that the refrigerant flow paths 48 are configured to provide cooling. The associated text is HSC-D-CS. An operating mode code of 0000 0100 indicates that the prime mover 46 is a diesel engine operating in a continuous mode, at the lower of two operating speeds, and that the refrigerant flow paths 48 are configured to provide cooling. The associated text is LSC-D-CT.

As hereinbefore stated, a start-of-trip header 94, a text header 100, and a frame header 102, are each followed by a system data log entry 116. The format of a system data log entry 116 is shown in FIG. 12. A system data log entry 116 includes a real time clock header 98, a sensor reference header 96, sensor data in the form of the two sensor basic data log 104, followed by data 106 from any additional sensors, if any, and, if the set point has been changed, the sensor data is followed by set point change data 108.

FIG. 13 illustrates the 4 byte format of the two sensor basic log, with "normal" or 8-bit resolution for the controlling temperature sensor, and with "normal" or B-bit resolution for the non-controlling temperature sensor. Byte 0 is application specific data field. Byte 1 is an 8 bit control sensor field, which is calculated as the reading of the controlling temperature sensor, with the controlling sensor being identified in bit 5 of byte 2 of the last header entry into data array 70, minus the control sensor's data log reference value included in the latest sensor reference table header entry 96 in the data array 70. A calculation outside the field limit will cause the entry of a new sensor reference table header 96 into data array 70.

Bits 0–4 of byte 2 is a 5-bit non-control sensor field, which is calculated as the non-control sensor reading minus the control sensor reading. Although the non-controlling sensor is not referenced by the sensor reference table, an entry is provided in the sensor reference table header for this sensor, and it is updated along with any update required for the control sensor reference.

Bits 5–7 of byte 2 and bit 0 of byte 3 identify the current operating mode of unit 20, with one of the modes being detected is a defrost mode. The 4-bit code allows up to 16 different operating modes to be identified. Bit 5 of byte 3 is set immediately after exiting a defrost mode, and it remains set for a minimum of 45 minutes until the occurrence is logged. Bits 1–4 of byte 3 form a digital flag which is used to indicate that an event or active state has occurred since the last log. Bits 6 and 7 of byte 3 indicate the number of extended entries following the basic two sensor entry. If no extended entries follow, this field will be set to digital value 00. If more than two sensors are being monitored, the digital value would be 01 to indicate that the additional sensor data field 106 follows. If only two sensors are monitored but the set point has been changed, it would also be set to 01 to indicate that the set point change data field 108 follows. If both the additional sensor data field 106 and set point data change fields follow, then bits 6 and 7 would be set to 10 to indicate that two extensions follow.

Figure 14:
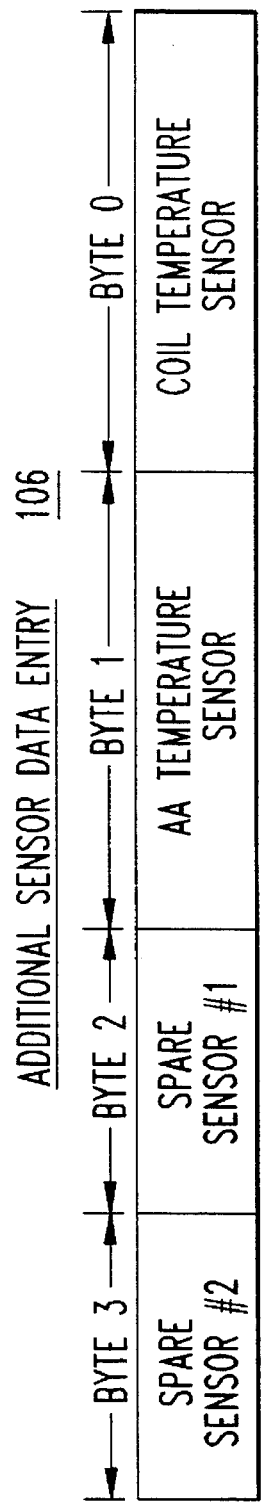
FIG. 14 illustrates the format of how additional sensor data is appended to the 2 sensor formats, when data from more than 2 sensors are to be stored at each constant time interval.

FIG. 14 illustrates an exemplary 4 byte format for the additional sensor data entry field 106. Byte 0 contains the reading of the hereinbefore mentioned coil temperature sensor 65 minus the data log reference value for this sensor contained in the latest sensor reference table header entry 96, byte 2 contains the reading of the ambient air temperature sensor 67 minus the data log reference value for this sensor contained in the latest sensor reference table header entry 96, and bytes 2 and 3 are reserved for any additional sensors, such as a humidity sensor, an atmosphere concentration sensor, and the like. A calculation outside the one byte limit for any sensor will initiate the logging of a new sensor reference table header.

Figure 15:
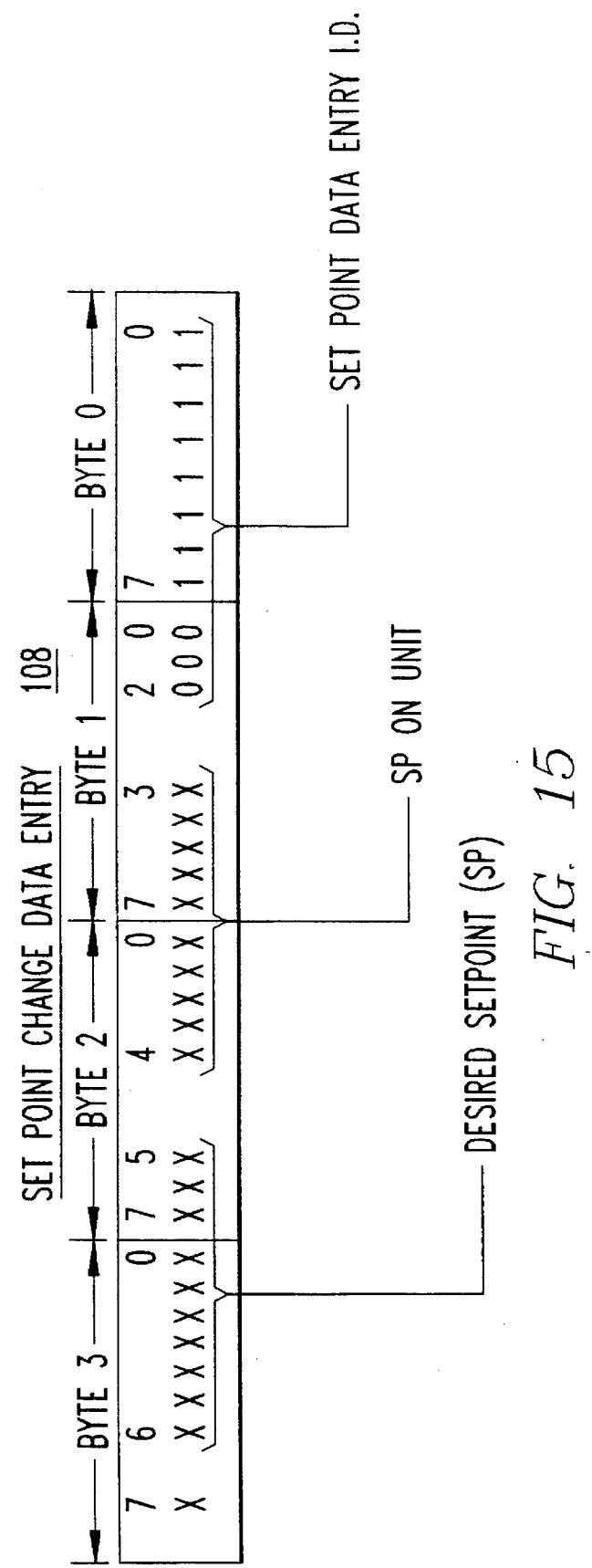
FIG. 15 illustrates the format of how information relative to entry of, or a change of, set point temperature, is appended to the 2 sensor formats.

FIG. 15 illustrates an exemplary 4 0 byte format for the set point change data entry field 108. Set point change data entry field 108 is an extended log entry after a power-up has been initiated, after a text header 100, start-of-trip header 94 or a frame header 102, and after detecting a change in the set point, such as entered via set point change means 38. Byte 0 and bits 0–2 of byte 1 are set to 000 1111 1111, to indicate that a change in set point follows. The new or desired set point is in the field defined by bits 5–7 of byte 2 and bits 0–6 of byte 3. If a set point reading is available from unit 20 it is placed in the field which includes bits 3–7 of byte 1 and bits 0–4 of byte 2, and otherwise the desired set point will also be placed in this field.

Figure 16:
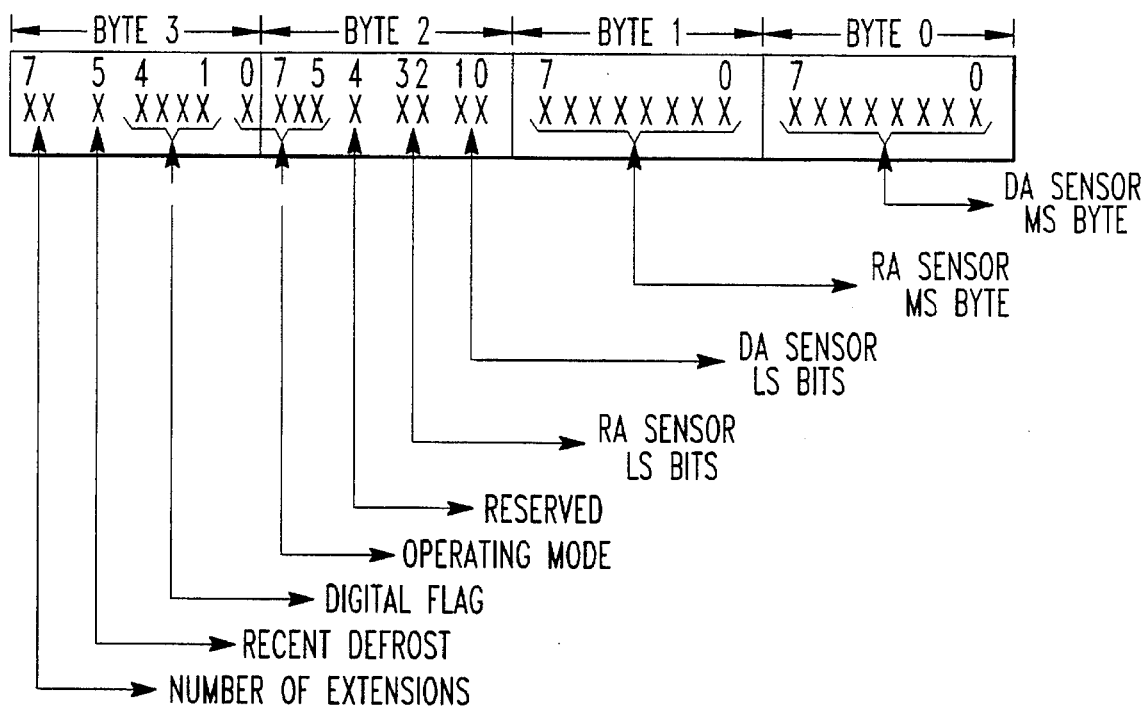
FIG. 16 illustrates the format of a 2 sensor basic log, high resolution, data entry to the data array of the data logger, which entry is entered on a time interval basis.

FIG. 16 illustrates the format of the two sensor basic log, with higher resolution for the return air and discharge air temperature sensors 40 and 42 than provided by the two sensor basic log data entry 104 with normal resolution. The two sensor basic log with higher resolution is referred to with reference 104', to indicate a modification. Byte 0 is no longer application specific in format 104', the locations of the discharge air and return air temperature fields are fixed in format 104', and their fields are extended, each being 10 bits in length. The two least significant bits of the discharge sensor field are located in bits 0 and 1 of byte 2, and the most significant byte of the discharge sensor field is located in byte 0. The two least significant bits of the return air sensor field are located in bits 2 and 3 of byte 2, and the most significant byte of the return air sensor field is located in byte 1. These sensor fields are each calculated as the sensor reading minus the sensor's data log reference value as contained in the latest sensor reference table header entry 96 in the data array 70. A calculation outside the field limit will initiate a new sensor reference table header entry 96 into data array 70.

Figure 17:
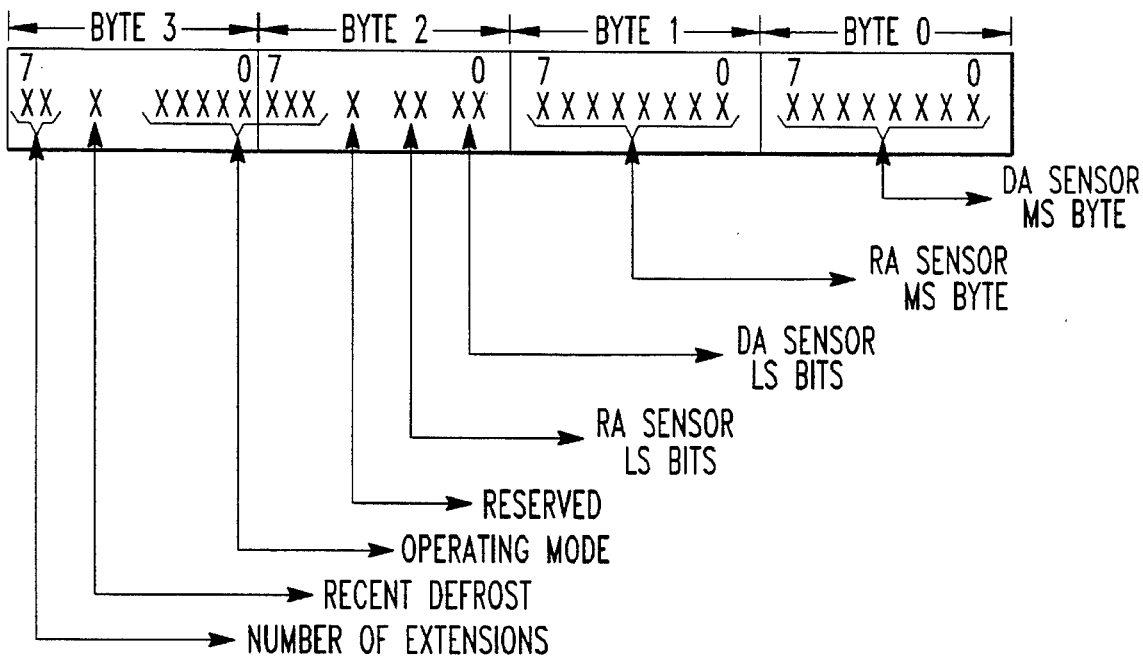
FIG. 17 illustrates the format of a 2 sensor extended operating mode log, high resolution, data entry to the data array of the data logger, which entry is entered on a time interval basis.

FIG. 17 illustrates the format of the extended operating mode logging according to the teachings of the invention, as hereinbefore referred to relative to FIG. 5, wherein bit 4 of byte 2 of the preamble 112' of an event header is set to logic 0 to indicate normal mode, ie., the operating mode code is defined by 4 bits in the 2 sensor basic log, and it is set to logic 1 to indicate an extended number of operating mode code values is provided, ie., the operating mode is defined by an 8-bit code, instead of by a 4-bit code. As illustrated in FIG. 17, the two sensor extended log is illustrated with reference 104", and it differs from the two sensor basic log with high resolution 104' by expanding the operating mode field to include the digital flag field. Digital flags are stored in extension fields, just like the additional sensor field 106 and the set point change field 108. thus, when unit 20 has more than 16 operating modes, the format 104" would be selected by setting bit 4 of byte 2 of the preamble 112' of an event header to logic 1.

Figure 18:
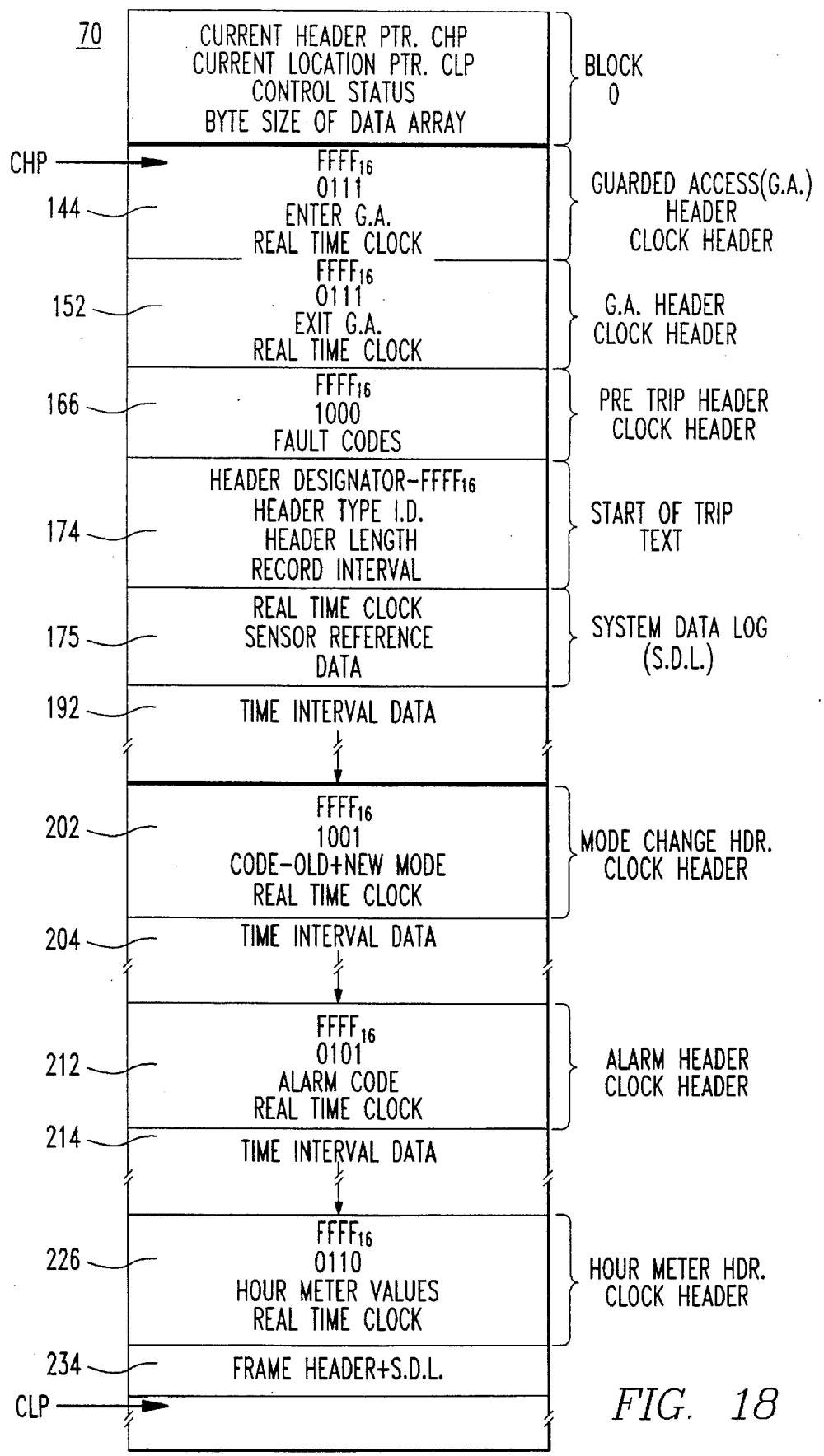
FIG. 18 illustrates a data array space of a data logger memory formatted according to the teachings of the invention, illustrating the entry of operator initiated headers, as well as the entry of event headers which seamlessly add time stamped events into the data array, along with constant time interval data, according to the program of FIG. 19.

FIG. 18 illustrates the data array 70 formatted according to the teachings of the invention. In order to retrieve data from data array 70, the data space is segmented into blocks each containing 128 ($80_{16}$) bytes. Block 0, as illustrated in FIG. 18 contains only pointer and status information, including a current header pointer CHP, and a current location pointer CLP. The CHP points to the first byte of the header loaded at the beginning of the current trip, ie., either a start-of-trip header 94 or a text header 100, or to a frame header when wrap around of the data space occurs. When the data array space is exhausted, the CHP is advanced to the next frame header, along with information from the current location, freeing up 10% of the data space for recording new data. The CLP points to the next location to be written in the data array 70.

Block 0 also includes a control status byte, and the byte size of the data array. The control status byte includes the same information as in the headers. The headers obtain their information from this location. In other words, the control status byte includes the number of sensors, the resolution of the sensor readings, normal length or extended length operating mode code, the controlling sensor, and the recording interval for time based data. The various entries to the data storage space of data array 70 following block 0 will be described relative to the description of FIG. 19.

Figure 19:
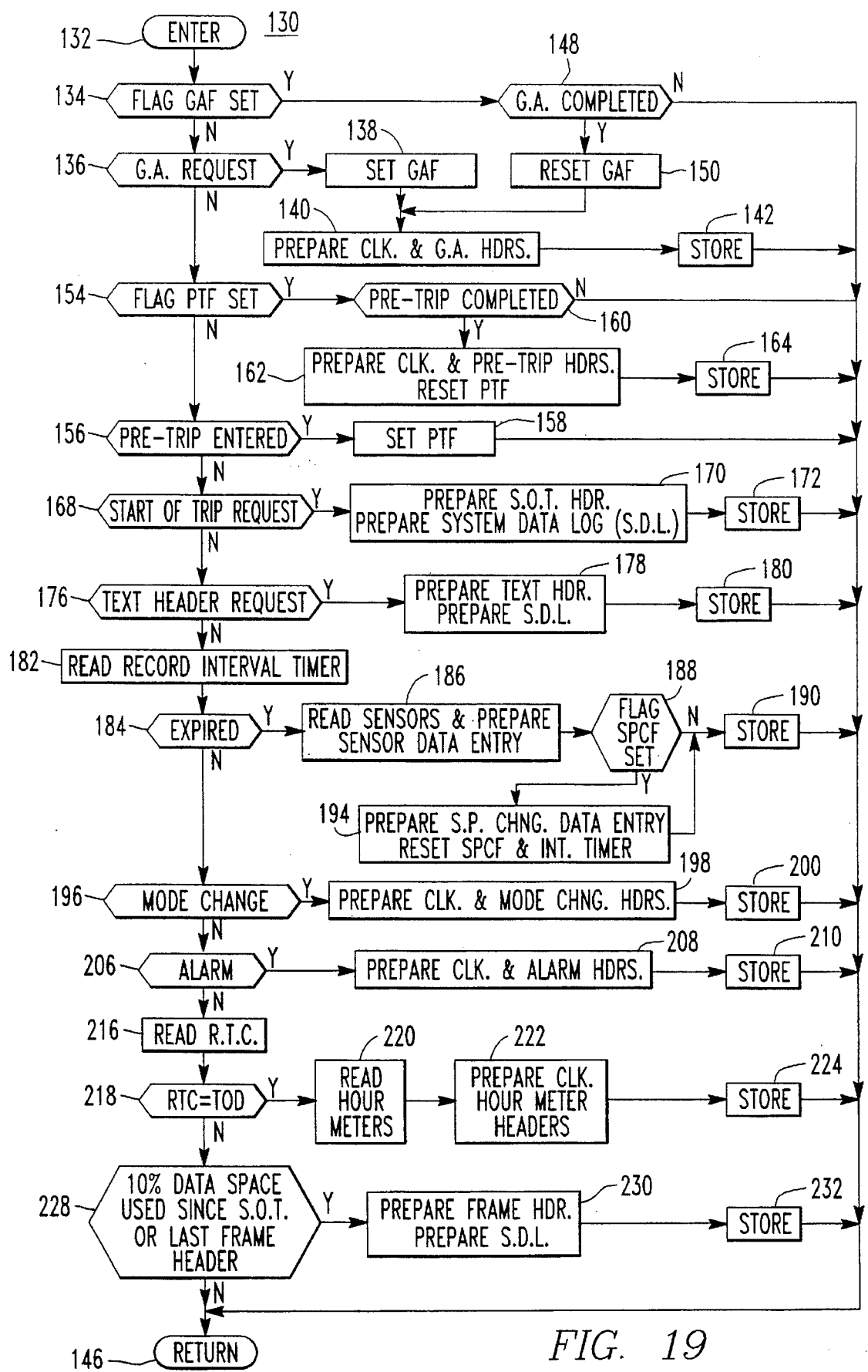
FIG. 19 is a flow chart of a program which prepares and stores operator headers, event headers, and constant time interval data according to the teachings of the invention.

FIG. 19 is a flow chart of a program 130 which illustrates certain steps of the invention in detail. Program 130 is entered periodically at 132 and step 134 checks RAM 74 to determine if a guarded access flag GAF is set. At this point of the program flag GAF will not be set and step 134 advances to step 136 which determines if the guarded access procedure 50 has been initiated. If it has, step 138 sets flag GAF and step 140 prepares the real time clock header 98 and the guarded access header 124 shown in detail in FIG. 8. Step 142 stores the clock and guarded access headers 98 and 124, respectively, in data array 70, as illustrated at 144 of data array 70 in FIG. 18, and program 130 exits at 146. Thus, the values of the programmable constants settable via the guarded access procedure 50 are stored before any changes are made during the current guarded access procedure.

Upon the next running of program 130 step 134 will now find flag GAF set and program 130 branches to step 148 which determines if the guarded access procedure 50 has been completed. When the guarded access procedure 50 has not been completed, step 148 goes to program return point 146. Program 130 will then cycle through steps 134 and 148 until step 148 finds the guarded access procedure 50 has terminated, and step 148 then goes to sep 150 which resets flag GAF. Step 150 proceeds to step 140 which prepares the clock and guarded access headers 98 and 124, respectively, using the latest values of the programmable constants. Step 142 stores the clock and guarded access headers 98 and 124 in data array 70, as illustrated at 152 in FIG. 18.

Figure 19A:
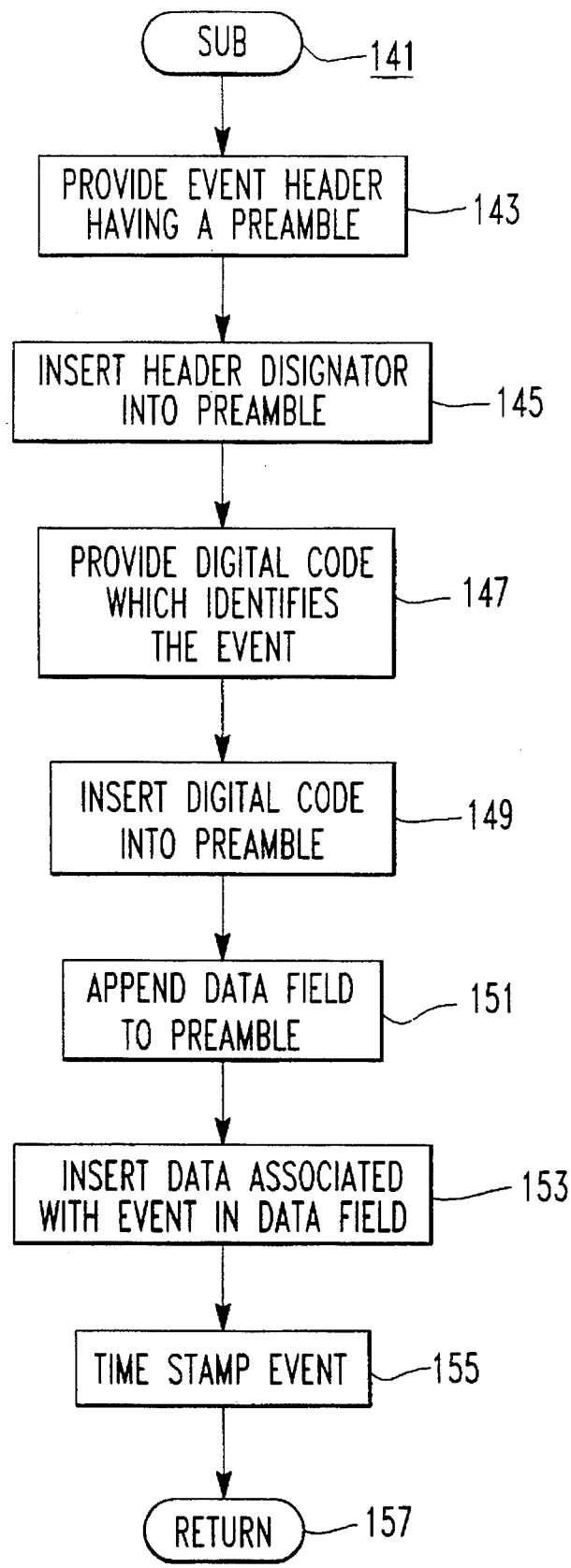
FIG. 19A is a sub-routine called by the program of FIG. 19 to prepare event headers.

Step 140 is implemented by the steps shown in a sub-routine 141 in FIG. 19A. The steps shown in FIG. 19A may be contained in step 140, or step 140 may simply call sub-routine 141 to prepare the event and clock headers. Step 141 provides an event header having the form of the guarded access header data entry 124 shown in FIG. 8, with event header 124 having a preamble 112' which includes the same number of data bytes as the operator initiated header 111 shown in FIG. 3. Step 145 inserts the header designator $FFFF_{16}$ associated with the operator initiated header 111 into the same location of the preamble 117' as it occupies in the operator initiated header 111. Step 147 provides a digital code 0111 which uniquely identifies guarded access header 124, and step 149 inserts the digital code into the same location of the preamble 112' of guarded access header 124 as the header identifying code occupies in the preamble 112 of the operator initiated header 111. Step 151 appends the data field 114 to the preamble of 112' of guarded access header 124, and step 153 inserts predetermined data into the data field 114, which in this case includes the programmable constants prior to any modification to be made by the current guarded access procedure. Step 155 time stamps the entry of guarded access header data entry 124 into data array 70, and sub-routine 141 returns to the main program 130 at return point 157.

When step 136 finds no guarded access request, step 154 checks RAM 74 to determine if a pre-trip flag PTF is set. At this point in program 130 flag PTF will not be set, and step 154 advances to step 156 which determines if the operator of transport refrigeration unit 20 has initiated the pre-trip procedure 52. When step 156 finds that pre-trip procedure 52 has been initiated, step 158 sets flag PTF and step 158 then proceeds to program return point 146. On the next running of program 130, step 154 will now find that flag PTF is set, and step 154 proceeds to step 160 which determines if the pre-trip procedure 52 has been completed. Until step 160 finds that the pre-trip procedure 52 has been terminated, program 130 will cycle through steps 134, 136, 154, and 160.

When step 160 finds the pre-trip procedure 52 has been completed, step 160 branches to step 162 which prepares the clock header 98 and the pre-trip header 126 shown in detail in FIG. 9, storing any fault codes generated during pre-trip in the data field 114 of pre-trip header 114. Step 162 may call the hereinbefore described subroutine 141 shown in FIG. 19A to prepare the pre-trip and clock headers 114 and 98, respectively. Step 162 also resets pre-trip flag PTF. Step 164 stores the clock and pre-trip headers 98 and 126 in data array 70, as illustrated at 166 in FIG. 18.

When step 156 finds the pre-trip procedure 52 is not active, step 156 proceeds to step 168 which determines when the operator initiates a start-of-trip request. When initiated, step 168 goes to step 170 which prepares the start-of-trip header 94, using the updated format described relative to alarm header 120 in FIG. 5, instead of the prior art format 111 of FIG. 3. Step 170 also prepares the system data log entry 116 shown in detail in FIG. 12. Step 172 stores start-of-trip header 94 in data array 70, as shown at 174 in FIG. 18, and step 172 also stores the system data log entry 116 in data array 70, as shown at 175.

When step 168 finds no start-of-trip request, step 168 proceeds to step 176 which checks for an operator's request for a text header, in which the operator inputs the desired text to be printed in a report of the trip. When step 176 finds a text header request, step 178 prepares the text header 100, again using the updated format, and step 178 also prepares the system data log 116 shown in FIG. 12. Step 180 stores the text header 100 and system data log 116 in data array 70, as indicated at locations 174 and 175 of FIG. 18.

During a trip of transport refrigeration unit 20 an interval timer is constantly reset each time it expires, using the predetermined constant time interval value in the latest header stored in array 70. When step 176 finds no text header request, program 130 advances to step 182 which checks the record interval timer in RAM 74 to determine if the current time interval has expired. When the time interval expires, step 184 branches to step 186 which reads the sensors according to the control byte of byte 0, and step 186 prepares a sensor data entry 104, 104' or 104" according to FIGS. 13, 16 or 17, respectively, adding the additional sensor data entry 106 shown in FIG. 14, to the two sensor log when more than two sensors are to be monitored. Before storing the resulting data entry, step 188 checks a set point change flag SPCF in RAM 74 to determine if the set point has been changed by an operator. When flag SPCF is not set, step 190 stores the data entry prepared by step 186 in data array 70, as illustrated at 192 in FIG. 18. When step 188 finds flag SPCF set, step 188 branches to step 194 which prepares the set point change data entry 108 shown in FIG. 15, and entry 108 is appended to the data entry prepared in step 186. Step 194 then proceeds to step 190 which stores the basic data entry with the necessary data extensions, which data would be in the hereinbefore mentioned location 192 of data array 70.

When step 184 finds that the record time interval has not expired, step 184 proceeds to step 196 which determines if transport refrigeration unit has had a mode change. For example, a flag may be set in RAM 74 when an operational mode changes. When step 196 finds a mode change, such as from high speed cool to low speed cool during initial temperature pull down of conditioned space 22, step 196 branches to step 198 which prepares the clock header 98 and the mode change header 128 shown in detail in FIG. 10, inserting the requisite mode change code in the data field 114 of header 128. Step 198 may call the subroutine 141 shown in FIG. 19A to prepare the clock header 98 and the mode change header 128, respectively. Step 200 then stores the clock and mode change headers 98 and 128 in data array 70, as shown at data location 202 in FIG. 18. If the mode change was signaled by a setting of a flag, this flag would now be reset.

The expiration of another record time interval will be noted as hereinbefore described, storing the new time based readings of the sensors at 204 of FIG. 18.

When step 196 finds no mode change, step 196 advances to step 206 which determines if an alarm has been generated, or cleared, as both the generation and clearing of an alarm are noted and stored in an alarm header. Upon finding a new alarm, or clearing of an old alarm, step 208 prepares the clock header 98 and the alarm header 120 shown in detail in FIG. 5, storing the requisite alarm code and associated readings in the data field 114 of alarm header 120. Step 208 may call the sub-routine 141 shown in FIG. 19A to prepare the clock and alarm headers 98 and 120, respectively. Step 208 then proceeds to step 210 which stores the clock and alarm headers 98 and 120, respectively, in data array 70, as illustrated at 212 in FIG. 18.

The expiration of another record time interval will be noted as hereinbefore described, storing the new time based readings of the sensors at 214 of FIG. 18.

The hour meters 56 are read and their readings stored at least once a day, at a programmable time-of-day constant TOD, such as at midnight. When step 206 finds no new alarm generation or alarm clearing, step 206 advances to step 216 which reads the real time clock 92 and step 218 compares the reading with the selected time of day value TOD. When step 218 finds that the time of day reading RTC reaches the selected time of day TOD for reading the hour meters 56, step 220 reads hour meters 56 and then advances to step 222. Step 222 prepares the clock header 98 and the hour meter header 122 shown in detail in FIG. 7, storing the readings of the hour meters 56 in the data field 114 of hour meter header 122. Step 222 may call the sub-routine 141 shown in FIG. 19A to prepare the clock and hour meter headers 98 and 122, respectively. Step 224 then stores the clock and hour meter headers 98 and 122, respectively, in data array 70, as indicated at 226.

As hereinbefore stated, a frame header 102 is inserted into data array 70 each time approximately 10% of the data space has been used up, in order to free up storage space in the event of a data wrap around. Step 218, upon finding that RTC is not equal to TOD, advances to step 228 which determines if 10% of the allotted data array space has been used since the header which started the current trip, or since the last frame header 102 stored in data array 70. When step 228 finds that 10% of the data space has been used, step 230 prepares frame header 102, using the updated format, and step 230 also prepares the system data log entry 116 shown in FIG. 12. Step 232 stores the frame header 102 and system data log entry 116 in data array 70, as illustrated at 234 of FIG. 18. Assuming this is the last entry to data array 70, the current location pointer CLP will point to the next location of data array 70 to be written into, as illustrated in FIG. 18.

We claim:

1. A method of adding asynchronous logging of data relative to predetermined events into a time based data logger which stores operator initiated headers in a data array, as well as data relative to predetermined variables of a transport refrigeration unit, which data is stored synchronously at predetermined constant time intervals, with the operator initiated headers including a predetermined preamble having a predetermined number of data bytes which include a header designator and a digital code which uniquely identifies the specific type of header being entered, comprising the steps of:

providing an event header having a preamble which includes the same number of data bytes as the preamble of the operator initiated headers, for each type of event to be asynchronously stored in the data array, inserting the header designator associated with the operator initiated headers into the same location of the preamble of each of the event headers as it occupies in the operator initiated headers, providing a digital code which uniquely identifies each event header, inserting each digital code into the same location of the preamble of each of the event headers as the digital code occupies in the preamble of the operator initiated headers, appending a data field to the preamble of each event header, inserting predetermined data into the data field of an event header when an event occurs, storing an event header in the data array asynchronously, at the time the associated event occurs, time stamping each event header when the event header is stored in the data array, and downloading data stored in the data array to a predetermined device, including asynchronously stored event headers and synchronous data stored at predetermined constant time intervals.

2. The method of claim 1 wherein the transport refrigeration unit includes means for generating alarms in response to predetermined malfunctions, with the step of providing a digital code providing a digital code which identifies an alarm header, and including the steps of:

providing alarm codes which uniquely identifies the type of alarm generated, and inserting the requisite alarm code into the data field of an alarm header when the alarm is generated.

3. The method of claim 2 including the steps of:

providing predetermined data relative to each malfunction of the transport refrigeration unit which generates an alarm, inserting the predetermined data in the data field of the associated alarm header, and storing the alarm header in the data array.

4. The method of claim 1 wherein the transport refrigeration unit includes a plurality of hour meters which record operational time of predetermined parameters of the transport refrigeration unit, with the step of providing a digital code providing a digital code which identifies an hour meter header, and including the steps of:

reading the hour meters at least once in each 24 hour period, inserting the hour meter readings into the data field of an hour meter header, and storing the hour meter header in the data array.

5. The method of claim 1 wherein the transport refrigeration unit has a plurality of programmable constants and a predetermined guarded access procedure for entering and changing the constants, with the step of providing a digital code providing a digital code which identifies actuation of the guarded access procedure, and including the steps of:

reading the programmable constants when the guarded access procedure is initiated, inserting the readings of the constants in the data field of a guarded access header, and storing the guarded access header in the data array to provide a record of the values of the programmable constants prior to modification thereof.

6. The method of claim 5 including the steps of:

reading the programmable constants when the guarded access procedure is terminated, inserting the readings of the programmable constants in the data field of a guarded access header, and storing the guarded access header in the data array to provide a record of the values of the programmable constants after modification thereof.

7. The method of claim 1 wherein the transport refrigeration unit includes a pre-trip procedure which checks the units for malfunctions prior to a trip and provides fault codes relative to any malfunction detected during the pre-trip procedure, with the step of providing a digital code providing a digital code which identifies a pre-trip header, and including the steps of:

reading fault codes generated during a pre-trip procedure, inserting the fault code reading into the data field of a pre-trip header, and storing the pre-trip header in the data array.

8. The method of claim 1 wherein the transport refrigeration unit changes operational modes as required to hold the temperature of a conditioned space within a predetermined temperature range adjacent to a selected set point temperature, with the step of providing a digital code providing a digital code which identifies an operational mode change header, and including the steps of:

providing a code which uniquely identifies each operating mode of the transport refrigeration unit, detecting when the operational mode of the transport refrigeration unit changes, inserting the code associated with the new operational mode in the data field of a mode change header, and storing the mode change header in the data array.

9. The method of claim 1 including the steps of:

providing a data format in an event header for time interval data having selectable sizes of data fields to provide a selectable resolution for predetermined data, and identifying the selected resolution in the preamble of the event header.

10. The method of claim 1 including the steps of:

providing a data format in an event header for time interval data having selectable sizes of data fields dedicated to digital code, and identifying the selected size of the data field dedicated to digital code in the preamble of the event header.

11. The method of claim 1 wherein the transport refrigeration unit changes operational modes as required to hold the temperature of a conditioned space within a predetermined temperature range adjacent to a selected set point temperature, with the step of providing a digital code providing a digital code which identifies an operational mode change header, and including the steps of:

providing a data format for time interval data having selectable sizes of data fields dedicated to digital code, and identifying the selected size of the data field dedicated to digital code in the preamble of the event header, providing a digital code which uniquely identifies each operating mode of the transport refrigeration unit, sizing the digital code to correspond to the selected size of the data field dedicated to digital code, detecting when the operational mode of the transport refrigeration unit changes, inserting the digital code associated with the new operational mode in the data field dedicated to digital code, and storing the mode change header in the data array.

* * * * *